United States Patent [19]

Shipley et al.

[11] 4,399,053

[45] * Aug. 16, 1983

[54] HIGH EFFICIENCY CATALYST CONTAINING TITANIUM, ZIRCONIUM AND ZINC FOR POLYMERIZING OLEFINS

[75] Inventors: Randall S. Shipley, Alvin; Donald F. Birkelbach, Angleton; Kirby Lowery, Jr., Lake Jackson, all of Tex.

[73] Assignee: The Dow Chemical Company, Midland, Mich.

[*] Notice: The portion of the term of this patent subsequent to Dec. 9, 1997, has been disclaimed.

[21] Appl. No.: 219,690

[22] Filed: Dec. 24, 1980

[51] Int. Cl.$^3$ ............................................. C08F 4/64
[52] U.S. Cl. ............................ 252/429 B; 252/429 C; 526/114
[58] Field of Search ........................ 252/429 B, 429 C

[56] References Cited

U.S. PATENT DOCUMENTS

| | | | |
|---|---|---|---|
| 3,066,126 | 11/1962 | Porter et al. | 260/94.3 |
| 3,068,180 | 12/1962 | vanAmerongen et al. | 252/429 |
| 3,207,741 | 9/1965 | Schafer et al. | 260/94.3 |
| 3,215,682 | 11/1965 | Farrar et al. | 260/94.3 |
| 3,257,332 | 6/1966 | Ziegler et al. | 252/429 |
| 3,458,493 | 7/1969 | Gaeth et al. | 260/94.3 |
| 3,489,731 | 1/1970 | Imoto et al. | 260/80.78 |
| 3,520,826 | 7/1970 | Tanaka et al. | 252/429 |
| 3,678,025 | 7/1972 | Birrell | 260/94.9 E |
| 3,681,317 | 8/1972 | Pioli et al. | 260/94.9 B |
| 3,687,910 | 8/1972 | Jones | 260/80.78 |
| 3,728,283 | 4/1973 | Chauvin et al. | 252/429 B |
| 3,732,198 | 5/1973 | Whiteley | 260/94.9 C |
| 3,738,944 | 6/1973 | Candlin | 252/431 R |
| 3,740,384 | 6/1973 | Ballard et al. | 260/94.9 C |
| 3,840,508 | 10/1974 | Ballard et al. | 260/83.2 R |
| 3,932,307 | 1/1976 | Setterquist | 252/430 |
| 3,959,239 | 5/1976 | Butler et al. | 526/25 |
| 3,989,878 | 11/1976 | Aishima et al. | 526/116 |
| 4,006,101 | 2/1977 | Matsuura | 252/429 C |
| 4,011,383 | 3/1977 | Setterquist | 526/154 |
| 4,017,525 | 4/1977 | Setterquist | 260/429.3 |
| 4,018,707 | 4/1977 | Wyatt et al. | 252/430 |
| 4,067,822 | 1/1978 | Gessell et al. | 252/429 B |
| 4,091,082 | 5/1978 | Gessell et al. | 423/413 |
| 4,104,198 | 8/1978 | May, Jr. et al. | 252/429 B |
| 4,109,071 | 8/1978 | Berger | 526/114 |
| 4,120,820 | 10/1978 | Birkelbach | 252/429 B |
| 4,163,831 | 8/1979 | Gessell | 526/153 |
| 4,172,050 | 10/1979 | Gessell et al. | 252/431 R |
| 4,213,880 | 7/1980 | Knight et al. | 252/431 R |
| 4,238,355 | 12/1980 | Shipley et al. | 252/429 C X |
| 4,250,286 | 2/1981 | Shipley | 252/429 B X |
| 4,269,733 | 5/1981 | Shipley | 252/429 B X |
| 4,308,369 | 12/1981 | Shipley et al. | 526/122 |

FOREIGN PATENT DOCUMENTS

| | | |
|---|---|---|
| 49-14348 | 4/1974 | Japan. |
| 1492379 | 11/1977 | United Kingdom. |
| 1493159 | 11/1977 | United Kingdom. |
| 1500873 | 2/1978 | United Kingdom. |
| 2028845 | 3/1980 | United Kingdom. |

OTHER PUBLICATIONS

L. Petkov et al., "Organometallics in Ethylene Polymerization with a Catalyst System TiCl$_4$ Al$_9$(C$_2$H$_5$)$_2$Cl Mg$_9$c$_6$H$_5$)$_2$:1, Suspension Polymerization Process", POLYMER, vol. 19, 5-78 pp. 567-569.

*Primary Examiner*—Patrick Garvin
*Attorney, Agent, or Firm*—J. G. Carter

[57] ABSTRACT

Compositions exhibiting high catalytic activity in the polymerization of α-olefins are prepared by reacting trivalent or tetravalent titanium compounds such as titanium tetraalkoxides, zirconium compounds such as tri-n-butoxy zirconium chloride, an organomagnesium component such as di-n-hexyl magnesium, a halogen source such as ethyl aluminum dichloride, a divalent zinc compound such as diethyl zinc and an organoaluminum compound if the halide source or magnesium component does not contain sufficient quantities of aluminum. Polymerization processes employing this catalyst composition do not require conventional catalyst removal steps in order to provide polymers having suitable color and other physical characteristics and these catalysts produce polymers having broader molecular weight distributions and lower melt indices than do corresponding catalysts without both the divalent zinc and zirconium compounds.

7 Claims, No Drawings

HIGH EFFICIENCY CATALYST CONTAINING TITANIUM, ZIRCONIUM AND ZINC FOR POLYMERIZING OLEFINS

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene and 1-butene in the presence of metallic catalysts, particularly the reaction products of organometallic compounds and transition metal compounds, can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,112,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is believed to be caused by the general tendency of these catalysts to become rapidly depleted or deactivated by the significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. Nos. 3,392,159, 3,737,393, West German Patent Application No. 2,231,982 and British Pat. Nos. 1,305,610, and 1,358,437. While the increased efficiencies achieved by using these recent catalysts are significant, even higher efficiencies are desirable, particularly in copolymerization processes. These high efficiency catalysts generally produce polymers of relatively narrow molecular weight distribution. It is therefore desirable to have, for some applications such as for use in injection molding, high efficiency catalysts which produce polymers and copolymers having a broader molecular weight distribution.

In view of the foregoing problems encountered in the use of conventional Ziegler catalysts, it would be highly desirable to provide a polymerization catalyst that is sufficiently active, even at solution polymerization temperatures above 140° C., to produce such high quantities of olefin homopolymers or copolymers or mixed α-olefin polymers per unit of catalyst that it is no longer necessary to remove catalyst residue in order to obtain a polymer of the desired purity while at the same time producing a broadened molecular weight distribution for improved processing of injection molded articles.

SUMMARY OF THE INVENTION

The present invention, in one aspect, is the catalytically active reaction product of (A) at least one trivalent or tetravalent titanium compound, (B) at least one zirconium compound, (C) a divalent zinc compound, (D) an organomagnesium component and (E) a halide source. If components (D) and/or (E) do not contain any or contain insufficient quantities of an aluminum compound, then additional quantities of an organoaluminum compound should be added. The organomagnesium component is (1) a complex of an organomagnesium compound and an organometallic compound which solubilizes the organomagnesium compound in a hydrocarbon solvent or (2) a hydrocarbon soluble organomagnesium compound. The halide source is a nonmetallic halide corresponding to the empirical formula R'X wherein R' is hydrogen or an active monovalent organic radical and X is halogen. Alternatively, the halide source is a metallic halide corresponding to the empirical formula $MR_{y-a}X_a$ wherein M is a metal of Group IIIB or IVB of Mendeleev's Periodic Table of the Elements, R is a monovalent organic radical, usually hydrocarbyl or hydrocarbyloxy, X is halogen, y is a number corresponding to the valence of M and a is a number from 1 to y. The proportions of the foregoing components of said catalytic reaction products are such that the atomic ratios of the elements are:

Mg:Zr is from about 1:1 to about 100:1; preferably from about 1.5:1 to about 40:1; most preferably from about 2:1 to about 25:1;

Al:Zr is from about 0.1:1 to about 100:1; preferably from about 0.5:1 to about 50:1; most preferably from about 1:1 to about 25:1;

Zr:Ti is from about 0.1:1 to about 50:1; preferably from about 0.5:1 to about 40:1; most preferably from about 1:1 to about 20:1;

Zn:Ti is from about 0.1:1 to about 200:1; preferably from about 0.5:1 to about 100:1; most preferably from about 1:1 to about 50:1;

excess X:Al is from about 0.0005:1 to about 10:1; preferably from about 0.002:1 to about 2:1; most preferably from about 0.01:1 to about 1.4:1.

Excess X is the quantity of halide above that which would be theoretically required to convert the magnesium compound to the dihalide.

In a second aspect, the invention is a process for polymerizing at least one α-olefin under conditions characteristic of Ziegler polymerization wherein the aforementioned reaction product is employed as the sole catalyst when such contains aluminum or when there is additionally employed an organometallic compound containing aluminum if the catalyst does not contain aluminum.

In view of the reduced activity of conventional Ziegler catalysts in the copolymerization of α-olefins, particularly at solution polymerization temperatures, it is indeed surprising that the aforementioned catalytic reaction product is a high efficiency catalyst capable of producing more than a million pounds of olefin polymer or copolymer per pound of transition metal having relatively a broad molecular weight distribution under such polymerization conditions. Accordingly, olefin polymers produced in accordance with the foregoing process generally contain lower amounts of catalyst residues than polymers produced in the presence of conventional catalysts even after subjecting such conventionally produced polymers to catalyst removal treatments. Further, these catalytic reaction products provide polymers produced therefrom with a relatively broader molecular weight distribution and a lower melt index than do corresponding catalysts without the zinc and zirconium compounds.

The catalyst formulations of the present invention are usually a dilute black slurry of very fine particles. The $MgCl_2$ present is a fine, whitish precipitate with a surface area of about 250 $m^2$/gm. The $ZrCl_4$ exhibits a wide range of particle size. If an alcohol is present, the solid $ZrCl_4$ dissolves, presumably to a compound of the general formula $Zr(OR)_xCl_y$, with $0<x<4$ and $0<y<4$. Addition of diethyl zinc and an aluminum compound to the catalyst turns its color to a dark gray to black. The exact structure of the Zn-Zr-Ti complex is not known.

The catalysts of the present invention provide for the high efficiency polymerization of alpha olefins, including mixed olefin copolymers, the resultant polymers or copolymers having a relatively broad molecular weight distribution and, in most cases, two separate and distinct molecular weight peaks as evidenced by gel permeation chromatography.

DETAILED DESCRIPTION OF THE PREFERRED EMBODIMENTS

The present invention is most advantageously practiced in a polymerization process wherein an α-olefin or mixture of α-olefins are polymerized, generally in the presence of hydrogen as a molecular weight control agent, in a polymerization zone containing an inert diluent and the catalytic reaction product as hereinbefore described. Especially advantageous is the copolymerization of ethylene and one or more higher α-olefins using the catalytic reaction product of this invention. The foregoing polymerization process is most beneficially carried out under an inert atmosphere and relatively low pressure, although very high pressures are optionally employed.

Olefins which are suitably homopolymerized or copolymerized in the practice of this invention are generally the aliphatic α-monoolefins or non-conjugated α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,4-hexadiene, 1,7-octadiene and the like. It is understood that α-olefins may be copolymerized with one or more other α-olefins and/or with small amounts, i.e., up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene, with up to 50, especially from about 0.1 to about 40, weight percent of propylene, butene-1, hexene-1, octene-1, 4-methylpentene-1, 1,7-octadiene or similar α-olefin or non-conjugated α-diolefin based on total monomer.

As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred.

Advantageously, the tetravalent titanium compound employed herein is represented by the empirical formula: $TiX_n(OR)_{4-n}$, wherein X is a halogen, particularly chlorine or bromine, R is a hydrocarbyl group having from 1 to 20, preferably from 1 to about 10 carbon atoms, and n has a value of 0 to 4. Such titanium compounds are preferably derived from the titanium halides wherein one or more of the halogen atoms are replaced by an alkoxy or aryloxy group. Exemplary of such compounds include tetra(n-butoxy) titanium, tetra(isopropoxy)titanium, di(n-butoxy) titanium dichloride, monoethoxy titanium trichloride, tetraphenoxytitanium, mixtures thereof and the like.

Suitable trivalent titanium compounds include α- and γ-TiCl₃ and the trivalent titanium complexes represented by the empirical formula: $TiZ_3(L)_x$ wherein Z is halide, and L is an electron donating compound such as water or an organic electron donor, e.g., alcohol, ether, ketone, amine or olefin and x is a whole number from 1 to 6. Usually, the organic electron donor has from 1 to 12 carbon atoms and donates an unshared pair of electrons to the complex. Exemplary electron donating compounds suitably employed include aliphatic alcohols, e.g., isopropyl alcohol, ethanol, n-propyl alcohol, butanol and others having from 1 to 10 carbon atoms; ethers, ketones, aldehydes, amines, olefins, and the like having from 1 to 20 carbons atoms; and water. In preferred complexes, Z is chloride or bromide, most preferably chloride and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complex is not known, it is believed to contain 3 valence bonds to the halide ions and 1 to 6, preferably 2 to 4, coordination bonds to the electron donating compound. In addition to a α-TiCl₃ the Δ, γ and β crystalline forms of titanium trichloride are advantageously employed in the preparation of the complex. Also suitable are titanium tribromide, titanium fluoride and the like. Of the foregoing, the γ- and α-forms of titanium trichloride are preferred. These complexes and their preparation are more fully described by Birkelbach in U.S. Pat. No. 4,120,820 which is incorporated herein by reference.

Suitable zirconium compounds which can be employed herein include those represented by the empirical formula $Zr(OR)_xX_z$ wherein each R is independently a hydrocarbyl group having from 1 to about 20, preferably from 1 to about 10, carbon atoms, each X is independently a halogen atom, preferably chlorine or bromine, and x and z independently have values from zero to 4 and the value of x plus z is 4.

Particularly suitable zirconium compounds include, for example, $ZrCl_4$, $ZrBr_4$, $Zr(OnBu)_4$, $Zr(OnPr)_4$, $Zr(OEt)_2Cl_2$, $Zr(OEt)_2Br_2$, $Zr(OnPr)_2Cl_2$, $Zr(OnPr)_2Br_2$, $Zr(OiPr)_2Cl_2$, $Zr(OiPr)_2Br_2$, $Zr(OnBu)_2Cl_2$, $Zr(OnBu)_2Br_2$, mixtures thereof and the like. In the above formulae, ET=ethyl, iPr=isopropyl, nPr=normal propyl and nBu=normal butyl.

The zirconium compounds represented by the empirical formula $Zr(OR)_xX_z$, wherein x has a value corresponding to the valence of Zr; z has a value such that $0<z<4$, can be prepared in situ by adding a zirconium tetrahalide and an aliphatic alcohol having from 1 to about 20, preferably from about 1 to about 10, carbon atoms to the catalytic reaction mixture as the zirconium component at a mole ratio of alcohol to zirconium halide of from about 0.01 to about 10, preferably from about 0.25 to about 4.

Suitable zinc compounds which can be advantageously employed include those zinc compounds represented by the formula $R_2Zn$ wherein R is independently as hereinbefore defined. Particularly suitable zinc compounds include, for example, diethyl zinc, diphenyl zinc, mixtures thereof and the like.

The organomagnesium component is a hydrocarbon soluble compound or complex illustrated by the empirical formula $MgR''_2 \cdot xMR''_y$ wherein $R''$ is independently hydrocarbyl or hydrocarbyloxy, M is Al, Zn, B, Si, Sn or P, preferably Al, and x has a value of from about zero to 10, especially from about zero to about 0.25 and y denotes the number of hydrocarbyl groups which corresponds to the valence of M. In order to obtain maximum catalyst efficiency at polymerization temperatures above 180° C., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium diisopropyl magnesium, di-n-hexyl magnesium, isopropyl-n-butyl magnesium, ethyl-n-hexyl magnesium, ethyl-n-butyl magnesium, di-n-octyl magnesium and others wherein each alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Suitable hydrocarbon soluble organomagnesium compounds and/or complexes are commercially available from Texas Alkyls, Inc., Lithium Corporation of America and Schering AG Industrie-Chemikalien.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride and preferably as active as t-butyl chloride. In addition to the organic monohalides, it is understood that organic dihalides, trihalides and other polyhalides that are as active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide and diphenyl methyl chloride.

Suitable metallic halides, as set forth by formula hereinbefore, are organometallic halides and metal halides wherein the metal is in Group IIIA or IVA, of Mendeleev's Periodic Table of Elements. Preferred metallic halides are aluminum halides of the empirical formula $AlR_{3-a}X_a$ wherein each R is independently hydrocarbyl as hereinbefore defined, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent. The order of addition has not been found to be critical as long as the organomagnesium compound is not added to a mixture containing the titanium component without first converting the organomagnesium compound to the magnesium dihalide or without having the halide source already present in the solution.

The foregoing catalyst components are combined in proportions sufficient to provide atomic ratios as previously mentioned.

In cases wherein neither the organomagnesium component nor the halide source contains aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 2000:1, preferably from 1:1 to 200:1. However, when polymerization temperatures above 180° C. are employed, the aluminum compound is used in proportions such that the Mg:Al ratio is more than 0.3:1, preferably from 0.5:1 to 10:1, and Al:Ti ratio is less than 120:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction is preferably carried out in the presence of an inert diluent. The concentrations of catalyst components are preferably such that when the essential components of the catalytic reaction product are combined, the resultant slurry is from about 0.0005 to about 1.0 molar (moles/liter) with respect to magnesium. By way of an example of suitable inert organic diluents can be mentioned liquefied ethane, propane, isobutane, n-butane, 2,2,4-trimethylpentane, n-hexane, the various isomeric hexanes, isooctane, paraffinic mixtures of alkanes having from 6 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

If desired, the organomagnesium component and the halide source can be prereacted before adding such reaction product to the other components or before the other components are added to such reaction product. The reaction is usually conducted in the presence of an inert solvent or diluent.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0 to about 300° C., preferably at solution polymerization temperatures, e.g., from about 130° to about 250° C., for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent of excess monomer is employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer(s) and solvent, if any of the latter is present, thus removing the heat of reaction. In any event, adequate means should be provided for dissipating the exothermic heat of polymerization. If desired, the monomer(s) can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer(s) and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residues and to possess a relatively broad molecular weight distribution.

The following examples are given to illustrate the invention, and should not be construed as limiting its scope. All parts and percentages are by weight unless otherwise indicated.

In the following examples, the melt index values $I_2$ and $I_{10}$ were determined by ASTM D 1238-70 and the density values were determined by ASTM D 1248. The peak molecular weight, weight average molecular weight, $\overline{M}_w$, and number average molecular weight, $\overline{M}_n$, values were obtained by gel permeation chromotography. The peak molecular weight is the weight average molecular weight of the most abundant species.

Molecular weight (MW) and $\overline{M}_w/\overline{M}_n$ (polydispersity) were determined using a Water's Model 200 gel permeation chromatograph, GPC, that had been modified for high temperature analyses. The solvent used was 1,2,4-trichlorobenzene. The chromatograph was run at 135° C. and used three 4-ft. columns with a permeability respectively of $10^4$, $10^5$ and $10^6$Å. Since the characteristics of a GPC can vary from instrument to instrument, all analyses were performed on the same chromatograph.

In addition to using a GPC to determine MW and $\overline{M}_w/\overline{M}_n$, an approximate molecular weight distribution of the polymer was determined by examining the melt flow behavior of the polymer. For example, the quotient from the melt indices of a material measured at different loads ($I_2$ and $I_{10}$, for example) is recognized as a measure of the width of the molecular weight distribution (see G.B. Pat. No. 2,028,845A, page 1, lines 30-37). For the purpose of these examples, this is a more satisfactory method of determining the molecular weight distribution of the material since improvement in processability as related to flow characteristics is one purpose of broadening the molecular weight distribution.

The following abbreviations are employed in the examples.

DEZ = diethyl zinc
TEA = triethyl aluminum
EADC = ethylaluminum dichloride
HEM = hexyl ethyl magnesium
BuOH = n-butanol
BEM = n-butyl ethyl magnesium
DBM = n-butyl-sec-butyl magnesium
DNHM = di-n-hexyl magnesium

EXAMPLES 1-7 AND COMPARATIVE EXPERIMENTS A-G

A. Preparation of MgCl₂ (Examples 1 and 2 and Comparative Examples D and E)

MgCl₂ was prepared by bubbling anhydrous HCl through a 0.05 M solution of n-butyl ethyl magnesium (8.06 ml of 0.62 M BEM, obtained from Texas Alkyls, Inc., as MAGALA® BEM, diluted to 100 ml). The resultant reaction product was then degassed with nitrogen.

In Examples 3-7 and Comparative Experiments A-C and F, the MgCl₂ was prepared in situ.

B. Preparation of Catalyst

Table I gives the formulations for the catalysts used in each example. The table gives the order of component addition and molar ratio of the amount of component added to the molar amount of Ti(OiPr)₄ used. The titanium concentration in the catalysts was 0.00015 M with 2,2,4-trimethylpentane being the catalyst solvent.

C. Polymerization

Into a stirred one-gallon batch reactor was added 2 liters of 2,2,4-trimethylpentane, 20 psig of hydrogen, 120 psig of ethylene, and from 10-60 ml (0.0015-0.009 mMoles Ti) of the catalysts described in Table I. Ethylene pressure was kept constant and the reactor temperature was controlled at 150° C. Total reaction time was 30 minutes. Catalyst efficiencies and polymer properties are given in Table II.

As a comparison of the improvement of this new catalyst system over the prior art, notice example 1 and comparative experiment E. It is known to those skilled in the art that molecular weight distribution broadens with increased molecular weight (lower melt index) and this broadening can be evidenced in either the $I_{10}/I_2$ ratio or $\overline{M}_w/\overline{M}_n$ ratio of samples determined on the same instruments under the same conditions (see comparative experiments A-C). It has also been shown in a copending application Ser. No. 155,359 filed June 2, 1980 and allowed U.S. application Ser. No. 074,037, filed Sept. 10, 1979 by these applicants that the addition of diethyl zinc to the catalyst system shown in comparative experiment E leads to broader distributions (larger $I_{10}/I_2$ ratios). Therefore, comparative experiment E, containing diethyl zinc and having a lower melt index than example 1, should have a broader molecular weight distribution than example 1. Because of the improvements embodied in this application, however, example 1 shows a larger $I_{10}/I_2$ ratio (10.72 vs. 10.00) as well as a larger $\overline{M}_w/\overline{M}_n$ ratio (24.83 vs. 7.09) than comparative experiment E, indicating that it has a broader molecular weight distribution than comparative experiment E. That this improvement is not due to the zirconium alone can be seen by comparing comparative experiments B and F. Comparative experiment F, which contains zirconium, shows only a slight increase in $I_{10}/I_2$ ratio compared to comparative experiment B, which does not contain zirconium. Thus, even though the addition of diethyl zinc or zirconium individually to a catalyst would lead to some molecular weight distribution broadening, the synergistic effect of both compounds together leads to dramatic and unexpected broadening of the distribution as evidenced by the ratio of $I_{10}/I_2$.

TABLE I

| Example and Comp. Expt. No. | CATALYST FORMULATIONS CATALYST |
|---|---|
| 1 | 40 MgCl₂/50 DEZ/1 Ti(OiPr)₄/20 ZrCl₄/20 TEA |
| 2 | 40 MgCl₂/47 DEZ/3 EADC/10 TEA/1 Ti(OiPr)₄/5 ZrCl₄ |
| 3 | 40 HEM¹/50 EADC/50 DEZ/1 Ti(OiPr)₄/16 ZrCl₄ |

TABLE I-continued
CATALYST FORMULATIONS

| Example and Comp. Expt. No. | CATALYST |
|---|---|
| 4 | 16 ZrCl$_4$/1 Ti(OiPr)$_4$/48 BuOH/50 DEZ/50 TEA/40 BEM$^2$/30 SnCl$_4$ |
| 5 | 40 BEM$^2$/8 ZrCl$_4$/24 BuOH/50 DEZ/30 SnCl$_4$/50 TEA/1 Ti(OiPr)$_4$ |
| 6 | 40 BEM$^2$/30 SnCl$_4$/50 DEZ/50 TEA/24 ZrCl$_4$/80 BuOH/1 Ti(OiPr)$_4$ |
| 7 | 20 ZrCl$_4$/50 DEZ/50 TEA/40 DBM$^1$/30 SnCl$_4$/1 Ti(OiPr)$_4$ |
| A* | 50 EADC/40 DBM$^1$/1 Ti(OiPr)$_4$ |
| B* | 50 EADC/40 DNHM$^3$/1 Ti(OiPr)$_4$ |
| C* | 50 EADC/40 DBM$^1$/1 Ti(OiPr)$_4$ |
| D* | 40 MgCl$_2$/50 DEZ/50 TEA/1 Ti(OiPr)$_4$ |
| E* | 40 MgCl$_2$/50 DEZ/20 TEA/1 Ti(OiPr)$_4$ |
| F* | 50 EADC/1 Ti(OiPr)$_4$/8 ZrCl$_4$/24 BuOH/40 BEM$^2$ |

*Comparative Experiment
$^1$Magnesium alkyls HEM and DBM were obtained commercially from Lithium Corporation of America.
$^2$BEM obtained commercially as MAGALA ® BEM from Texas Alkyls, Inc.
$^3$DNHM obtained commercially as MAGALA ® DNHM from Texas Alkyls, Inc.

TABLE II
PHYSICAL PROPERTIES OF POLYMER PRODUCED

| Example and Comp. Expt. No. | Catalyst Efficiency $\overline{M}^1$ #PE/#Ti | $M^1$ #PE/#Zr | $M^1$ #PE/#Ti + Zr | $I_2$ | $I_{10}$ | $I_{10}/I_2$ | Density | Peak MW | $\overline{M}_w/\overline{M}_n{}^4$ |
|---|---|---|---|---|---|---|---|---|---|
| 1 | 0.135 | 3.54 | 3.45 | 3.56 | 38.16 | 10.72 | 0.9656 | 24,300 | 24.83 |
| 2 | 0.80 | 84.0 | 76.0 | 3.65 | 35.43 | 9.71 | 0.9636 | 24,600 | 7.00 |
| 3 | 0.32 | 10.5 | 10.2 | 8.67 | 80.36 | 9.27 | 0.9653 | 20,800 | 22.52 |
| 4 | 1.04 | 34.1 | 33.0 | 1.19 | 14.00 | 11.76 | 0.9641 | N.D.$^2$ | N.D. |
| 5 | 0.76 | 49.9 | 46.8 | 1.80 | 17.54 | 9.74 | 0.9648 | N.D. | N.D. |
| 6 | 0.30 | 6.56 | 6.42 | 0.51 | 7.00 | 13.73 | 0.9635 | 30,300 | 23.09 |
| 7 | 0.71 | 18.6 | 18.1 | 1.79 | 15.39 | 8.60 | 0.9605 | N.D. | N.D. |
| A$^3$ | 0.93 | — | — | 6.07 | 44.65 | 7.36 | 0.9671 | 31,500 | 2.58 |
| B$^3$ | 2.81 | — | — | 1.93 | 15.59 | 8.08 | 0.9633 | N.D. | N.D. |
| C$^3$ | 1.92 | — | — | 8.33 | 58.74 | 7.05 | 0.9666 | N.D. | N.D. |
| D$^3$ | 1.82 | — | — | 1.21 | 13.70 | 11.32 | 0.9640 | N.D. | N.D. |
| E$^3$ | 0.68 | — | — | 1.18 | 11.80 | 10.00 | 0.9622 | 32,000 | 7.09 |
| F$^3$ | 0.43 | 28.2 | 26.5 | 2.48 | 22.16 | 8.94 | 0.9636 | 29,700 | 7.19 |

$^1\overline{M}$ = million; M = thousand
$^2$N.D. = Not Determined
$^3$Comparative Experiment
$^4\overline{M}_w$ = weight average molecular weight; $\overline{M}_n$ = number average molecular weight

We claim:
1. A catalytically active reaction product of
   (A) a trivalent or tetravalent titanium compound selected from the group consisting of
      (1) α-TiCl$_3$,
      (2) γ-TiCl$_3$,
      (3) trivalent titanium complexes represented by the empirical formula TiZ$_3$(L)$_x$ wherein Z is a halide, L is an electron donating compound selected from water, alcohol, ether, ketone, amine or olefin and x is a whole number from 1 to 6;
      (4) tetravalent titanium compounds represented by the empirical formula TiX$_n$(OR)$_{4-n}$ wherein X is a halogen, R is a hydrocarbyl group having from 1 to about 20 carbon atoms and n has a value from zero to 4; and
      (5) mixtures thereof;
   (B) a zirconium compound represented by the empirical formula Zr(OR)$_x$X$_z$ wherein each R is independently a hydrocarbyl group having from 1 to about 20 carbon atoms, each X is a halogen atom, x and z independently have values from zero to 4 and the value of x plus z is 4;
   (C) a divalent zinc compound represented by the empirical formula R'$_2$Zn wherein each R' is independently a hydrocarbyl group having from 1 to about 20 carbon atoms;
   (D) an organomagnesium compound or a complex of an organomagnesium compound and an organometallic compound represented by the empirical formulas MgR''$_2$.xMR''$_y$ or MgR''$_2$ wherein R'' is hydrocarbyl or a hydrocarbyloxy group having from 1 to about 20 carbon atoms, M is aluminum, zinc, boron, silicon, tin or phosphorous and x has a value of from zero to about 10 and y has a value equal to the valence of M; and
   (E) a halide source selected from the group consisting of
      (1) an active non-metallic halide, said non-metallic halide corresponding to the empirical formula R'X wherein R' is hydrogen or an organic group at least as active as sec-butyl and X is halogen,
      (2) a metallic halide corresponding to the empirical formula M'R$^3_{y-a}$X$_a$ wherein M' is a metal of Group IIB, IIIB, or IVB of Mendeleev's Periodic Table of the Elements, R$^3$ is a hydrocarbyl or hydrocarbyloxy group, X is halogen, y is a number corresponding to valence of M' and a is a number from 1 to y, and
      (3) mixtures thereof;
   provided that the proportions of the foregoing components of said catalytically active reaction product are such that the atomic ratio of Mg:Zr is from about 1:1 to about 100:1; the atomic ratio of Al:Zr is from about 0.1:1 to about 100:1; the atomic ratio of Zr:Ti is from about 0.1:1 to about 50:1; the atomic ratio of Zn:Ti is from about 0.1:1 to about 200:1; the atomic ratio of excess X:Al is from about 0.0005:1 to about 10:1; and further provided that when the organomagnesium component and/or the halide source provides insufficient quantities of aluminum, there is also present an aluminum compound represented by the empirical formula AlR$_y$'X$_y$'' wherein R and X are as defined above and y' and y'' each have a value of from zero to three with the total value of y' plus y'' being three.

2. The catalytic product of claim 1 wherein the titanium compound is a tetravalent titanium compound represented by the empirical formula TiX$_n$(OR)$_{4-n}$, the divalent zinc compound is a dialkyl zinc compound wherein each alkyl group independently has from 1 to about 10 carbon atoms; and wherein the atomic ratio of Mg:Zr is from about 1.5:1 to abot 40:1; the atomic ratio of Al:Zr is from about 0.5:1 to about 50:1; the atomic ratio of Zr:Ti is from about 0.5:1 to about 40:1; the atomic ratio of Zn:Ti is from about 0.5:1 to about 100:1, and the atomic ratio of excess X:Al is from about 0.002:1 to about 2:1.

3. The catalytic product of claim 2 wherein each R in the titanium and zirconium compound is independently a hydrocarbyl group having from 1 to about 10 carbon atoms, excess X is chlorine, the atomic ratio of Mg:Zr is from about 2:1 to about 25:1; the atomic ratio of Al:Zr is from about 1:1 to about 25:1; the atomic ratio of Zr:Ti is from about 1:1 to about 20:1; the atomic ratio of Zn:Ti is from about 1:1 to about 50:1 and the atomic ratio of excess X:Al is from about 0.01:1 to about 1.4:1.

4. The catalytic product of claim 3 wherein the organomagnesium compound is a hydrocarbon soluble dihydrocarbyl magnesium wherein each hydrocarbyl group independently has from 1 to about 10 carbon atoms.

5. The catalytic product of claim 3 wherein the organomagnesium component is a hydrocarbon soluble complex represented by the empirical formula $MgR''_2 \cdot xAlR''_3$ wherein each $R''$ is a hydrocarbyl group having from 1 to about 10 carbon atoms and x has a value of from about zero to about 0.25; and wherein the zirconium compound is $Zr(OnBu)_3Cl$, $Zr(OnBu)_4$ or the product resulting from the combination of $ZrX_4$, wherein X is chlorine, with an aliphatic alcohol having from 2 to 4 carbon atoms in a mole ratio of zirconium halide to alcohol of from about 0.25:1 to about 4:1.

6. The catalytic product of claim 4 wherein the tetravalent titanium compound is tetraisopropoxy titanium, tetraethoxy titanium, tetra-n-butoxy titanium or tetramethoxy titanium.

7. The catalytic product of claim 5 wherein the tetravalent titanium compound is tetraisopropoxy titanium, tetraethoxy titanium, tetra-n-butoxy titanium or tetramethoxy titanium.

* * * * *